3,089,894
CYCLOHEXYL BORATE AND ITS PREPARATION
David D. Neiswender, Jr., Haddonfield, and Phillip S. Landis, Woodbury, N.J., assignors to Socony Mobil Oil Company, Inc., a corporation of New York
No Drawing. Filed June 8, 1961, Ser. No. 115,601
6 Claims. (Cl. 260—462)

This invention relates to new organic chemical compounds. More particularly, it relates to cyclohexyl borate and to its preparation and utilization.

An object of the invention is to provide novel chemical compounds.

Another object of the invention is to provide new chemical intermediates.

A further object of the invention is to provide a novel chemical reaction.

Still another object of the invention is to provide a novel chemical process technique.

Other objects and advantages of the invention will be apparent to those skilled in the art upon consideration of the detailed disclosure hereinbelow.

The present invention provides cyclohexyl borate and also its preparation by reacting cyclohexene with boric acid. Other aspects of the invention include the conditions under which the novel addition reaction is conducted.

It has been discovered that an addition reaction takes place between cyclohexene and boric acid under suitable reaction conditions in accordance with the following equation:

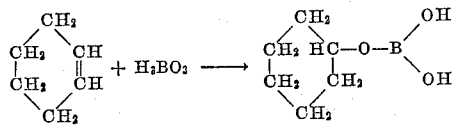

The fact that this reaction followed the course indicated was a distinct surprise, because no reaction was obtained under similar reaction conditions with straight chain monoolefins containing 3 to 12 carbon atoms, or with other cyclic olefins containing 5 or more carbon atoms in the ring.

A catalyst, as it is usually contemplated by those skilled in the art (e.g., HF, solid gels, free-radical initiators, etc.), does not appear to be necessary to the reaction of this invention. It is requisite, however, to carry out the reaction in the presence of a trace or small amount of water or water vapor. A substantial quantity of water should be avoided as it will hydrolyze the organic borate product to an alcohol and boric acid. This trace of moisture is easily provided by bubbling a stream of inert gas, such as nitrogen, through water and then slowly introducing the resulting humidified gas below the surface of the liquid reaction mixture. The moisture content of the reaction mixture must not be allowed to build up; hence excess moisture should be continually removed by a suitable means, such as a water trap for reflux operations. Usually the concentration of water in the reaction mixture is held between about 0.00001 and 0.01% by weight. It is also contemplated that the proper water concentration may be maintained in the reaction medium by refluxing azeotropic mixtures of the desired low water content. The latter procedure would not require the continual introduction and removal of moisture in a batch process.

Elevated temperatures are also desirable in the reaction. Refluxing the reaction mixture at atmospheric pressures in a vessel equipped with a reflux condenser is preferred, as it provides simple and accurate temperature control at approximately the boiling point of the cyclohexene. However, when desired, a closed reaction system and higher temperatures can also be used, if the temperature is kept below the point of decomposition of the cyclohexene and/or the product. The use of suitable azeotropic mixtures is especially valuable in such pressure systems. The use of such elevated pressures and higher temperatures permits more rapid reaction.

The molar ratios of cyclohexene to boric acid employed in this reaction can range from 1:1 to 10:1. However, since a stoichiometric excess of the olefinic reactant is preferred, molar ratios from 1:1 to 2:1 are recommended. The boric acid may be added to the reaction mixture in a single quantity or it may be added in several stages from time to time during the reaction as it is used up.

The novel mono-cyclohexyl borate is a solid which can be readily separated from the reaction solutions by cooling. It is subject to hydrolysis, particularly in hot water, forming cyclohexanol and boric acid.

The cyclohexyl borate is useful as a chemical intermediate, especially as an organic source for the introduction of borate radicals in various reactions, or in the production of cyclohexanol. As is well known, this alcohol is an excellent solvent for various gums, resins, waxes, rubbers and nitrocellulose and is also useful as an emulsifier.

For a better understanding of the nature and objects of this invention, reference should be had to the illustrative example hereinbelow, which is not to be construed as a limitation on the invention. Parts, where given, are by weight.

*Example*

A suitable four-necked glass flask is equipped with a stirrer, a thermometer, a gas delivery tube, a Dean-Stark water trap and reflux condenser. In the flask are placed 192 parts of pure cyclohexene and 48 parts of anhydrous boric acid. This mixture is stirred and heated at atmospheric pressure to the reflux temperature of approximately 80° C. A small amount of water vapor is then introduced continuously into the reaction mixture by bubbling a small stream of nitrogen (0.5–1.0 cu.ft./hr.) through a flask of water at about room temperature and then into the reaction mixture. At the same time, water is continuously removed from the reflux condensate by means of the trap. After about 80 hours of refluxing, an additional 48 parts of boric acid are added to the reaction mixture, and the reaction is continued for a total of 134 hours. Chilling this reaction mixture to a temperature of about 25° C. precipitates a white solid. The precipitate is filtered and then dried in a circulating air oven at 100° C. The resulting dry solid is found to have a melting point of 134° C.–139° C. It is readily soluble in organic solvents. Elemental and infra-red analyses identify the new product as monocyclohexyl borate. The conversion amounts to 62%, based on the boric acid.

A sample of the borate product is hydrolyzed by stirring with hot water and the liquid obtained separates into two layers upon standing. After removing the aqueous phase of this mixture, the organic phase is distilled and the distillate identified as cyclohexanol by its elemental analysis and by its infra-red spectrum, as well as by its physical characteristics and chemical reactions.

If the cyclohexanol be the desired end-product of the process, it may be obtained directly from the described reaction mixture without separating out the borate before hydrolysis. In such a case, water is added to the reaction mixture after the reaction has advanced sufficiently to form the borate, and further heating brings about hydrolysis of the borate to form the cyclohexanol which can then be recovered by fractional distillation of the mixture.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process which comprises reacting cyclohexene with boric acid in the presence of a minor quantity of water to produce monocyclohexyl borate.

2. A process which comprises reacting cyclohexene in stoichiometric excess with boric acid in the presence of a trace of water at elevated temperatures to produce monocyclohexyl borate.

3. A process according to claim 2 in which the reaction mixture is subsequently cooled and thereafter filtered to separate the monocyclohexyl borate.

4. A process according to claim 3 in which the monocyclohexyl borate is hydrolyzed to cyclohexanol and boric acid.

5. A process according to claim 1 in which the monocyclohexyl borate is hydrolyzed to cyclohexanol and boric acid.

6. A process according to claim 1 in which the boric acid is added to the reaction mixture in several stages.

References Cited in the file of this patent

UNITED STATES PATENTS 2,613,219    Clark _____ Oct. 7, 1952